HYDRAULIC SYSTEM FOR OPERATING A CYLINDER
Original Filed April 24, 1967 3 Sheets-Sheet 1
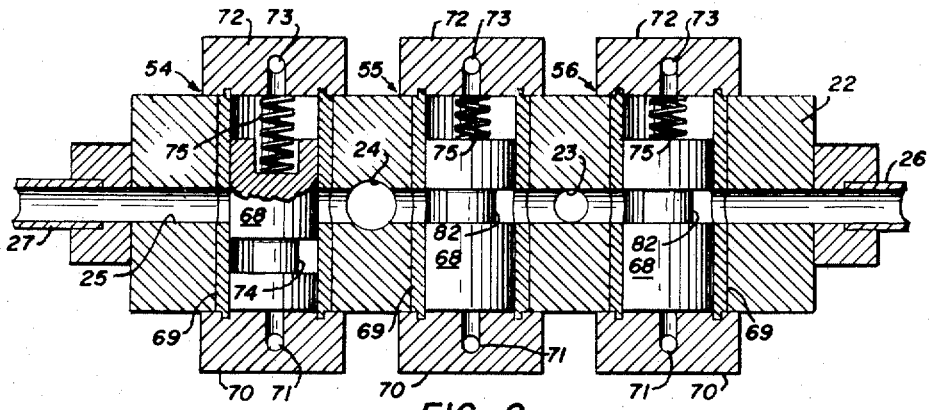
FIG. 2.
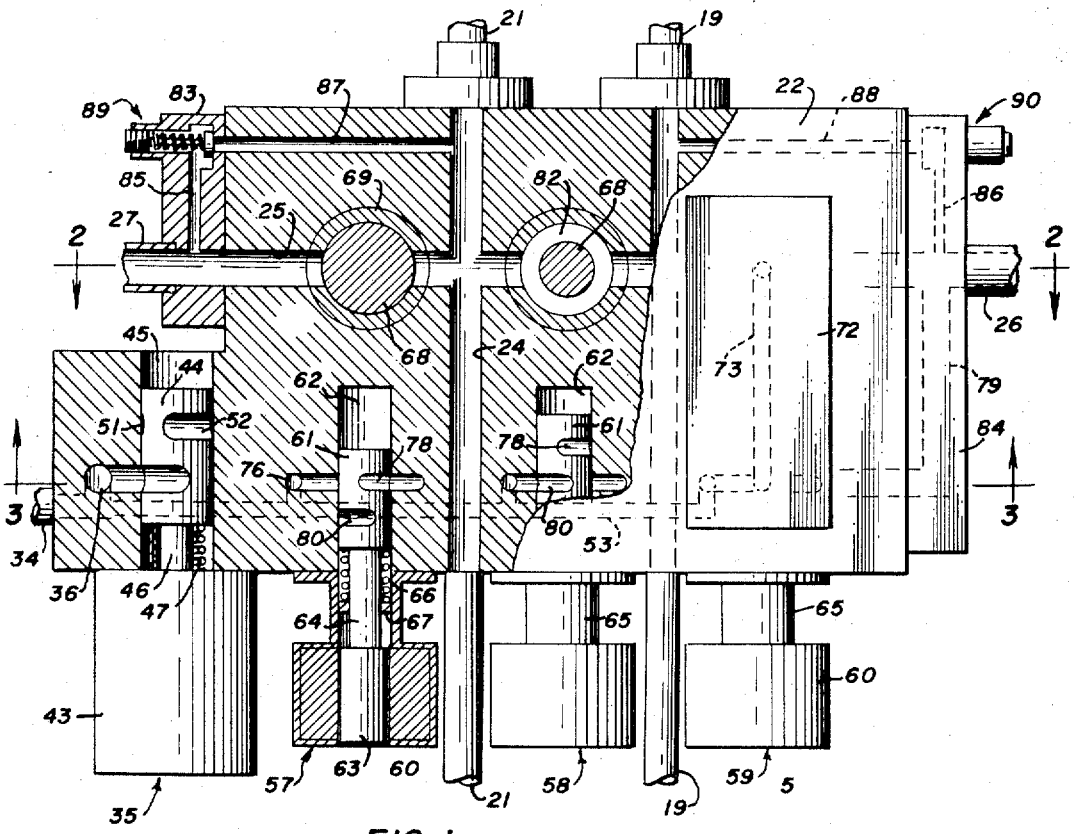
FIG. I.
HARVEY S. LANDERS
INVENTOR.
BY Herbert J. Brown
ATTORNEY

HYDRAULIC SYSTEM FOR OPERATING A CYLINDER

Original Filed April 24, 1967 3 Sheets-Sheet 2

HARVEY S. LANDERS
INVENTOR.

BY Herbert J. Brown

ATTORNEY

HYDRAULIC SYSTEM FOR OPERATING A CYLINDER

Original Filed April 24, 1967 3 Sheets-Sheet 3

HARVEY S. LANDERS
INVENTOR.

BY Herbert J. Brown
ATTORNEY

United States Patent Office

Re. 27,288
Reissued Feb. 15, 1972

27,288
HYDRAULIC SYSTEM FOR OPERATING A CYLINDER

Harvey S. Landers, 207 E. Broadway,
Fort Worth, Tex. 76118

Original No. 3,434,392, dated Mar. 25, 1969, Ser. No. 632,969, Apr. 24, 1967. Application for reissue May 7, 1970, Ser. No. 35,478
Int. Cl. F15b *11/08, 13/04*
U.S. Cl. 100—218 9 Claims

Matter enclosed in heavy brackets [ ] appears in the original patent but forms no part of this reissue specification; matter printed in italics indicates the additions made by reissue.

ABSTRACT OF THE DISCLOSURE

[The combination with a cylinder having a piston therein and an extending piston rod, first and second passage means connecting fluid pressure means with the piston and rod ends of said cylinder, transverse passage means connecting said first and second passage means and extending outwardly of each side thereof, and first, second and third valves in said transverse passage means, the second said valve being located between said first and second passage means and the first and third said valves being located outwardly and on each side of said first and second passage means.]

*An animal feed compression device characterized by having; in addition to the compression chamber, ram and discharge gate; a hydraulic cylinder for powering the ram; low and high pressure pumps connected directly with, respectively, the rod and piston ends of the hydraulic cylinder via first and second passages; and a plurality of valves exterior to the first and second passages for controlling fluid flow without blocking the passages; thereby eliminating hydraulic shock and fatigue of equipment. Also disclosed are specific embodiments having: (1) a throttling valve between passages for effecting a predetermined force balance on the hydraulic cylinder piston, and (2) a particular arrangement of the valves.*

[A hydraulic system for operating a cylinder and piston and including a high pressure low volume pump, and a high volume low pressure pump, both of which pumps operate simultaneously. A control block in the system has three valves therein whereby the piston in the cylinder is moved rapidly at the beginning of its stroke and whereby increased pressure is applied near the end of the stroke.]

This invention relates to hydraulic systems and has reference to a valve arrangement whereby a piston in a cylinder may be moved rapidly at the beginning of its stroke, yet increases its force near the end of its stroke.

The invention may be used in the compressing of mineral blocks such as those placed in feed lots and pastures for cattle. However, the invention is capable of other uses, for example, compressing and extruding feed in pellet form.

An object of the invention is to eliminate shock or "water hammer" at the ends of the strokes of the piston in a hydraulically operated cylinder and thereby reduce fatigue in the hydralic system.

*Another object of the invention is to employ, in an animal feed compression device, passages directly connecting respective fluid pressure means and respective ends of a hydraulically operated cylinder and valves exterior to the passages to control fluid flow without blocking the passages, and thereby eliminate the shock or "water hammer" due to sharp hydraulic pressure surges.*

*Another object of the invention is to provide an animal feed compression device in which a ram can be properly positioned by creating a predetermined force balance on a piston connected therewith and located in a hydraulically operated cylinder.*

Another object of the invention is to control the direction, velocity and delivered force of a piston in a hydraulically operated cylinder by changing the direction of return flow in the system.

A further object is to apply constant pressures in the direction of both sides of the piston at all times, thereby lending to the elimination of shock as referred to in the first herein stated object.

A further object is to include an auxiliary cylinder in a hydraulic system such as referred to and wherein the return fluid from the auxiliary cylinder provides pilot fluid for operating certain valves in the control block.

These and other objects of the invention will become apparent from the following description and the accompanying drawings, wherein:

FIGURE 1 is a broken elevational and sectional view of the control block and solenoid operated valves for regulating flow to the primary or working cylinder for controlling the action of the piston therein.

FIGURE 2 is a sectional view taken on line 2—2 of FIGURE 1.

Figure 4:
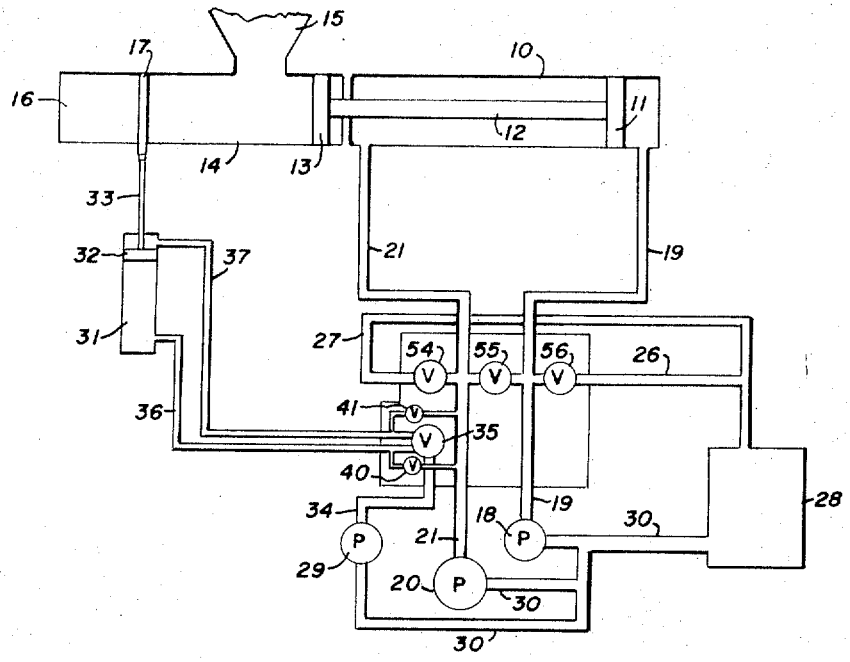
FIGURE 4 is a diagram of a hydraulic system according to the invention.

In the hydraulic system shown, FIGURE 4, there is a main working cylinder 10, a piston 11 therein, an extending pistion rod 12 and a ram 13 on the extending end of the rod. The ram 13 is slidable in an open end pressure chamber 14 having a supply hopper 15 communicating therewith. Outwardly of the open end of the pressure chamber 14 there is a delivery chute 16, and between the chamber and the chute there is a transverse slidable *or discharge* gate 17. The components thus far referred to are conventional and are not, therefore, herein described in detail.

A high pressure low volume pump 18 is in constant communication with the piston end of the cylinder 10 by means of a *passage or* line 19, and a low pressure high volume pump 20 is in constant communication with the rod end of the cylinder by means of another line 21. Between the cylinder 10 and pumps 18 and 20 there is a valve block 22 having parallel passageways 23 and 24 which are connected, respectively, with the hydraulic lines 19 and 21. A transverse passageway 25 extends through the block 22 and communicates with both of the passageways 23 and 24. The ends of the transverse passageway 25 are connected with return lines 26 and 27 extending to a reservoir 28 which, in turn, is connected with the pumps 18 and 20 and a third pump 29 by means of branched supply lines 30.

Figure 3:
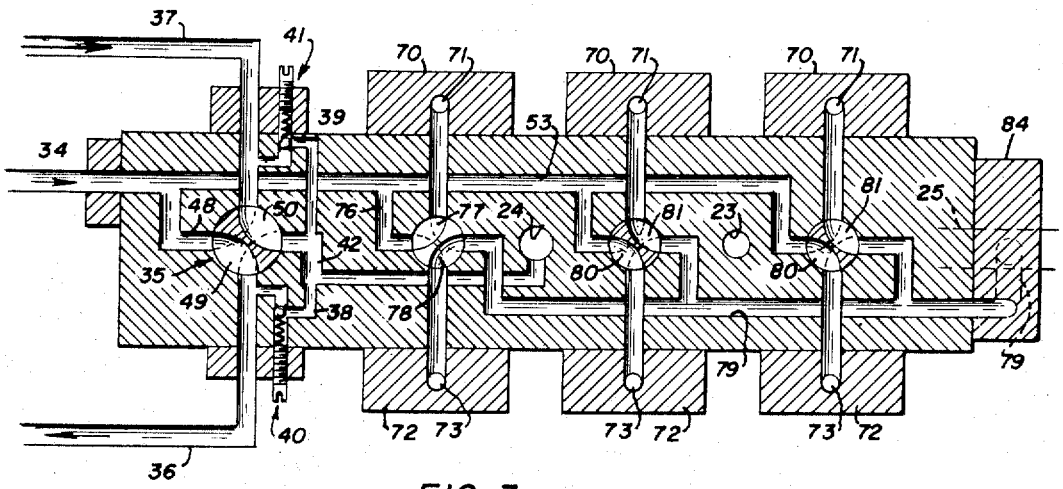
FIGURE 3 is a sectional view taken approximately on line 3—3 of FIGURE 1.

The referred to auxiliary cylinder is shown only in FIGURE 4 and is identified by reference numeral 31. This cylinder 31 is for operating the gate 17 and includes a piston 32 and extending piston rod 33 to which the gate 17 is attached. The third pump 29 has a line 34 exending to a solenoid operated plunger type fourway alve 35 which is connected to the piston and rod ends f the auxiliary cylinder 31 by lines 36 and 37. The last eferred to lines 36 and 37 have bypasses 38 and 39 ommunicating with the second described passageway 4. In the bypass lines there are spring loaded pressure elief valves 40 and 41 for relieving excess pressure in he lines 36 and 37. As shown in FIGURE 3, the bypass nes 38 and 39 are joined inwardly of their relief valves 0 and 41 where they are connected with a common assageway 42 to the second described passageway 24. as will become apparent, fluid reaching the last referred o passageway 24 is returned to the reservoir 28.

The fourway solenoid operated valve 35 includes a oil 43 mounted on the valve block 22, an armature not shown), a piston 44 slidably mounted in a cylinder 5 in the block, and a stem 46 connecting the armature vith the piston. The piston 44 is normally extended into he block 22 by reason of a compression spring 47 around he stem 46 and between the piston and the coil 43. As hown in FIGURE 3, fluid from the pump 29 and line 4 enters a passageway 48, moves through the arcuate assage 49 in the piston 44 and into the line 36 and hereby extends the piston 32 in the auxiliary cylinder 1. At the same time, return fluid through line 37 passes hrough an arcuate passage 50 in the piston 44, through he connected passageway 42 and to the second described assageway 24 in the block 22. When the coil 43 of the alve 35 is energized the valve piston 44 is moved to a osition whereby other arcuate passages 51 and 52 (see IGURE 1) register the passageway 48 and the return rom line 36 with passageway 42, thus reversing the flow ast described.

Within the valve block 22, and connected with the ne 34 from the pump 29, there is a pressure passageway 3 for supplying pilot fluid to spool type selector valves 4, 55 and 56 which are best illustrated in FIGURE 2. he spool valves 54, 55 and 56 are, respectively, operaed by first, second and third solenoid valves 57, 58 and 9 *that together constitute valve means exterior of pasages 19 and 21 to control fluid flow to the cylinder 10 vithout blocking flow.* Each solenoid valve 57–59 inludes a coil 60, a piston 61 slidably mounted in a cylinder 2 in the block 22, an armature 63 and a stem 64 conecting the armature and the piston. A conformingly haped cylindrical housing 65 mounts each coil 60 on he block 22 and a spring 66 therein locates and cushions ach piston in a normally extended position. The end of ach spring 66 opposite its piston 61 rests on a ring suport 67 in the housing 65.

The first spool valve 54 includes a piston 68 slidably nounted in a sleeve 69 transversely disposed in the valve lock 22 and which piston normally rests against a assage block 70 on the valve block 22 and has a presure passageway 71 which communicates, at one end, vith the interior of the sleeve 69. Similarly, there is a elief passageway block 72 on the valve block 22 at the ther end of the sleeve 69, and which passageway block as a passageway 73 for relieving pressure at that end f the piston 68. There is a groove 74 around the piston 8, which groove is located toward pressure passageway lock 70 so that a surface portion of the piston normally loses the transverse passageway 25 through the valve lock 22. The relief end of the piston 68 is axially reessed to receive one end of a compression spring 75, he other end of which bears against the relief passageay block 72. The pressure and relief passageway blocks 0 and 72 may be secured to the valve block 22 by suitble means such as gaskets and screws, not shown.

Referring now particularly to FIGURE 3, there are ranch lines 76 in the valve block 22 connecting the ressure passageway 53 with arcuate passages 77 in the istons 61, which passages are connected with the spool alve pressure passageway 73 when the pistons 61 of the olenoid valves are actuated. At the same time, the relief lines 71 of the spool valves 54–56 are in communication with arcuate passages 78 in the pistons 61 which, in turn, communicate with a relief line 79 in the block 22 and which relief line is connected with the transverse passage 25. When the pistons 61 of the solenoid valves 57–59 are raised (that is, when the coils 60 are not energized) arcuate passages 80 in the pistons connect the pressure branch lines 76 with the relief passageways 73. At the same time, other arcuate passages 81 in the pistons 61 communicate the passageways 71 extending to the spool valves 54–56 with the relief line 79 in the valve block 22.

Except for the location of their circumferential grooves 82, the second and third spool valves 55 and 56 are like the first spool valve 54; accordingly, all like parts have the same reference numerals. The grooves 82 are located to normally permit passage of fluid in those portions of the transverse passageway 25 on either side thereof.

On the ends of the valve block 22 there are smaller blocks 83 and 84 having small passageways 85 and 86 which connect the transverse passageway 25 with other passageways 87 and 88 in the valve block 22 and extend to the parallel passageways 24 and 23. Relief valves 89 and 90 are provided at the outer ends of the small passageways 85 and 86 and are arranged to permit flow from the parallel passageways 24 and 23 when pressure is excessive. As shown in FIGURES 1 and 3, the extending length of the relief line 79 is in the second mentioned small block 84 where it connects with the transverse passageway 25.

Referring now to FIGURES 5–8, all three pumps 18, 20 and 29 operate at the same time and during all phases of operations. Thus, hydraulic fluid enters the parallel passageways 23 and 24 and either reaches the ends of the working cylinder 10 or is diverted by the selected positions of the spool valves 54–56. As described in the foregoing, the spool valves 54–56 are operated by the solenoid valves 57–59. The latter (57–59) are operated by electrical circuits and selector switches, not shown.

Figure 5:
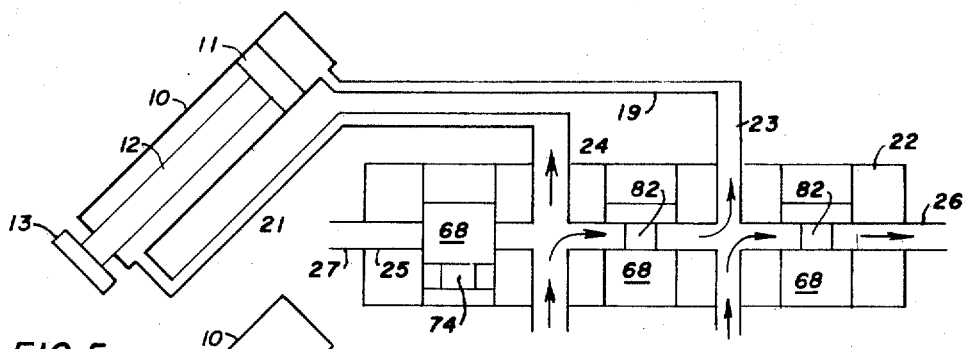
FIGURE 5 is a schematic view of the primary cylinder, control block and connecting lines, and showing the piston in its retracted position.

In FIGURE 5 the piston 11 is retracted in the cylinder 10 and the high pressure low volume fluid is directed toward the rod end of the cylinder through line 21 and some pressure is applied to the piston end through line 19. The direction of flow and pressure shown by the arrows is because the first spool valve 54 blocks the transverse passageway 25 outwardly of the second parallel passageway 24. At this time the second and third spool valves 55 and 56 are open and fluid not utilized flows through the unblocked portion of the transverse passageway 25, through the return line 26 and into the reservoir 28.

Figure 6:
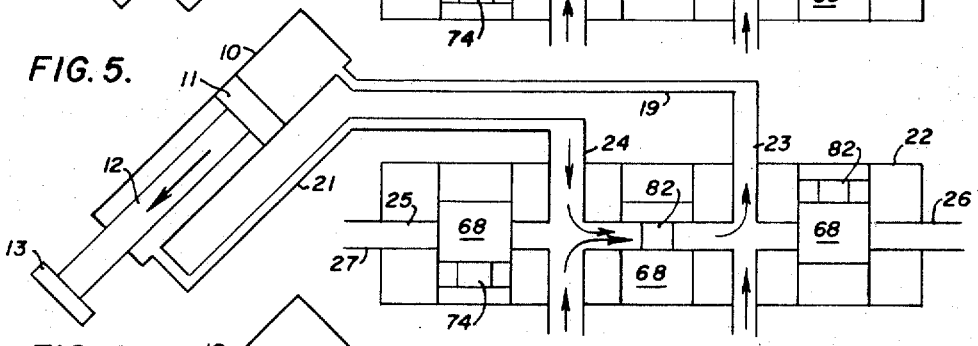
FIGURE 6 is a view similar to FIGURE 5, but showing the piston of the cylinder in an initially actuated position.
Figure 7:
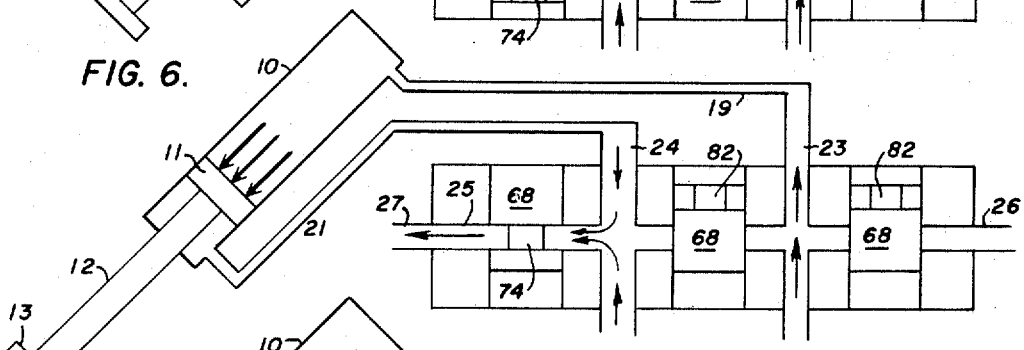
FIGURE 7 is a view similar to FIGURE 6 but showing the piston in a further extended position.
Figure 8:
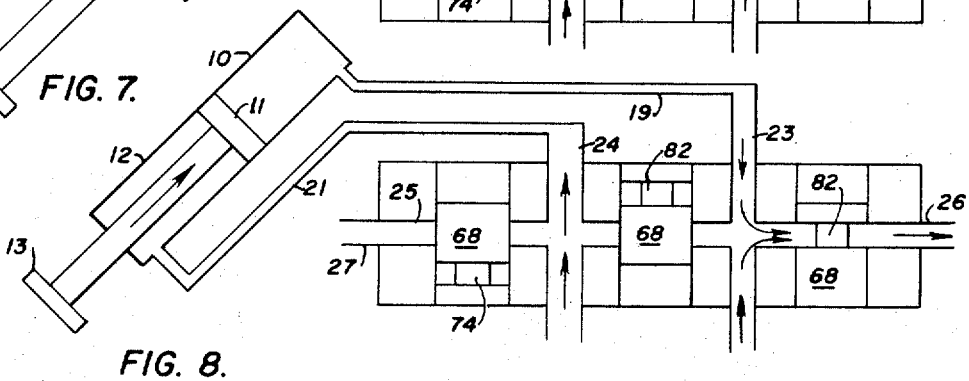
FIGURE 8 is similar to FIGURES 5–7 but shows the return movement of the piston.

In FIGURE 6 the first and third spool valves 54 and 56 are closed, thus directing fluid from the high volume low pressure pump 18 to the line 19 connected with the piston end of the cylinder 10. At the same time fluid from the low pressure high volume pump 20 is also directed to the piston end of the cylinder 10 through the center portion of the transverse passageway 25 and the line 19. This action causes the piston 11 to move rapidly at the beginning of its stroke. At the same time, return fluid from the rod end of the cylinder 10 flows through line 21 to the transverse passageway 25. Near the end of the stroke the first valve 54 is opened and the second and third valves are closed. FIGURE 7, thereby confining and directing all of the fluid from the first pump 18 to the piston end of cylinder 10 with the result that the piston 11 moves slower but with greater force. Before the end of a full stroke of the piston 11, the first and second spool valves 54 and 55 are closed and the third valve 56 is opened with the result that the piston changes its direction. At this time fluid in the piston end of the cylinder 10 is returned through line 19, passageway 23, the open valve 56 in that portion of the transverse passageway 25 and through the return line 26.

What is claimed is:

1. In combination with a cylinder having a piston therein and an extending piston rod: first and second passage means connecting fluid pressure means with the piston and rod ends of said cylinder, transverse passage means connecting said first and second passage means and extending outwardly of each side thereof, and first, second and third valves in said transverse passage means, the second said valve being located between said first and second passage means and the first and third said valves being located outwardly and on each side of said first and second passage means and including a valve block through which said first and second passage means and said transverse passage means extend, and wherein said valves are spool type valves slidably mounted in said block.

2. The combination defined in claim 1, and including solenoid valve means operating said spool type valves by means of pilot fluid.

3. The combination defined in claim 1, and including an auxiliary double acting cylinder, and means supplying said pilot fluid from the return from each end of said double acting cylinder.

*4. An animal feed compression device comprising:*

*(a) a chamber having a hopper for receiving loose feed;*

*(b) a ram disposed in a said chamber for compressing the feed;*

*(c) a discharge gate disposed opposite said ram for selective opening and closing said chamber for compressing the feed and for discharging the compressed, concentrated feed units from said chamber;*

*(d) a hydraulic cylinder having an internal piston connected via a connecting rod with said ram, and having a rod end and a piston end;*

*(e) a fluid reservoir;*

*(f) a low pressure pump means connected with said reservoir;*

*(g) a first passage including appropriate length flow lines connecting said low pressure pump means directly with said rod end;*

*(h) a high pressure pump means connected with said reservoir;*

*(i) a second passage including appropriate length flow lines connecting said high pressure pump means directly with said piston end; and*

*(j) valve means exterior to said first and second passages for operationally controlling fluid flow without blocking said first and second passages;*

*whereby normal operation is effected and the normally occurring shock due to sharp hydraulic pressure surges and attendant fatigue of equipment is eliminated.*

*5. The compression device of claim 4 wherein said valve means comprises first, second and third valves; said first valve being interposed in fluid communication between said reservoir and said first passage; said second valve being interposed in fluid communication between said first and second passages; and said third valve being interposed in fluid communication between said reservoir and said second passage.*

*6. The compression device of claim 5 wherein said second valve comprises an adjustable throttling valve for effecting a force balance on said internal piston such that said internal piston can be retained stationary at a predetermined position when said second and third valves are open.*

*7. The compression device of claim 4 wherein said fluid supply means also includes a third pump means having its discharge side connected via appropriate lines and relief valves in fluid communication with the discharge side of said low pressure pump.*

*8. An animal feed compression device comprising:*

*(a) a chamber having a hopper for receiving loose feed;*

*(b) a ram disposed in said chamber for compressing the feed;*

*(c) a discharge gate disposed opposite said ram for selective opening and closing said chamber for compressing the feed and for discharging the compressed, concentrated feed units from said chamber;*

*(d) a hydraulic cylinder having an internal piston connected via a connecting rod with said ram, and having a rod end and a piston end;*

*(e) low pressure and high pressure fluid pressure means connected directly with, respectively, said rod and piston ends of said cylinder via first and second passages for eliminating shock due to sharp hydraulic pressure surges during operation; and*

*(f) valve means exterior to said first and second passages for operationally controlling the fluid flow without blocking said first and second passages; said valve means including an adjustable throttling valve connected in fluid communication between said first and second passages for effecting a predetermined pressure balance on said internal piston.*

*9. The compression device of claim 8 wherein said throttling valve is also operable into the open and closed position and wherein said valve means include additional valves interposed in fluid communication between said reservoir and, respectively, said first and second passages.*

References Cited

The following references, cited by the Examiner, are of record in the patented file of this patent or the original patent.

UNITED STATES PATENTS

| | | | |
|---|---|---|---|
| 2,537,920 | 1/1951 | Smith. | |
| 2,570,622 | 10/1951 | Willis | 91—437 X |
| 2,705,916 | 4/1955 | Millgard. | |
| 2,780,987 | 2/1957 | Wall. | |
| 3,070,003 | 12/1962 | Stacy | 100—218 X |
| 3,129,720 | 4/1964 | Allen et al. | 91—436 X |

BILLY J. WILHITE, Primary Examiner

U.S. Cl. X.R.

91—414; 100—249, 269